Sept. 23, 1969  JAMES E. WEBB  3,468,548
ADMINISTRATOR OF THE NATIONAL AERONAUTICS
AND SPACE ADMINISTRATION
ROTATING SHAFT SEAL
Filed June 8, 1966

INVENTORS
ROBERT L. LESSLEY
GEORGE B. BOSCO JR.
BY
ATTORNEYS

United States Patent Office 3,468,548
Patented Sept. 23, 1969

3,468,548
ROTATING SHAFT SEAL
James E. Webb, Administrator of the National Aeronautics and Space Administration, with respect to an invention of Robert L. Lessley, Pomona, and George B. Bosco, Jr., Whittier, Calif.
Filed June 8, 1966, Ser. No. 556,830
Int. Cl. F16k 15/40, 15/54
U.S. Cl. 277—13               5 Claims

ABSTRACT OF THE DISCLOSURE

A liquid-vapor interface type of seal for the rotating shaft of a turbine utilizing mercury as the working fluid is disclosed. The seal includes three pumps extending between the shaft and the housing from the high-pressure turbine cavity to a low-pressure vented area. The pumps are adapted to pump liquid or vapor upon rotation of the shaft. First pump comprises a helical groove extending from the cavity to a slinger pump housed in a slinger space. The first pump is adapted to pump mercury vapor from the cavity toward the slinger space. The slinger pump tends to pump in the opposite direction of the first pump. The mercury vapor in the first pump and the slinger space is cooled and condensed to liquid by flowing coolant liquid through a passage in the housing or by injecting cooled mercury into the seal. A liquid-vapor interface is formed in the slinger space and leakage of mercury vapor toward the vent is further restricted by means of a molecular pump in the form of a second helical groove extending from the vent to the slinger space and is adapted on rotation of the shaft to pump mercury molecules toward said interface.

---

Figure 1:
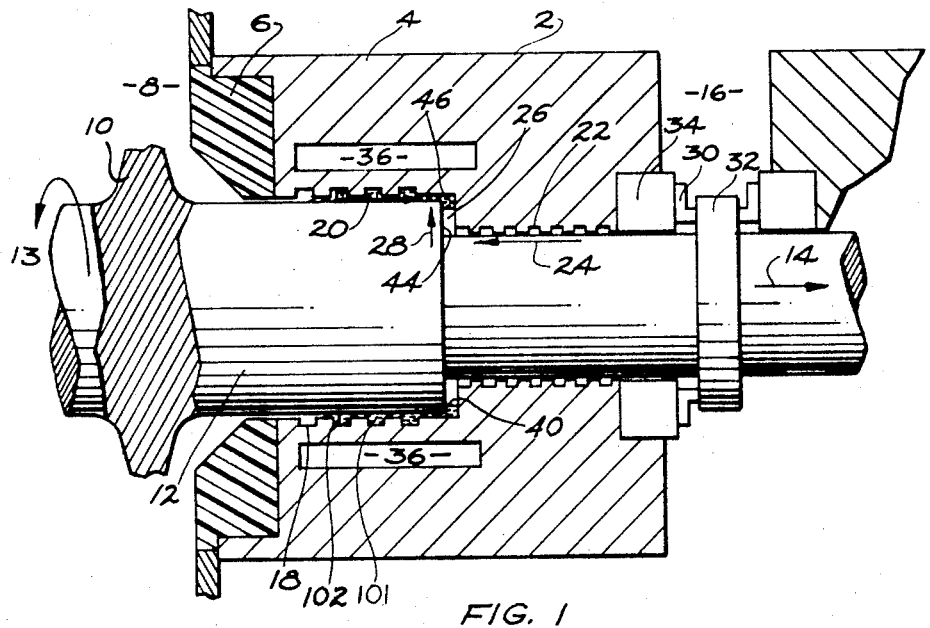

The invention described herein was made in the performance of work under a NASA contract and is subject to the provisions of section 305 of the National Aeronautics and Space Act of 1958, Public Law 85–568 (72 Stat. 435; 42 U.S.C. 2457).

BACKGROUND OF THE INVENTION

Field of the invention

This invention relates to a rotating shaft seal, and more specifically to an improved seal of the liquid-vapor inter-face type.

More particularly, this invention relates to a rotating shaft seal that can be utilized in a turbine to substantially prevent leakage from one compartment of a machine at a given pressure to another compartment of a machine at a lower pressure.

Description of the prior art

The typical turbine in the art is the well known steam-driven type. In this type of turbine, steam is admitted against the blades of a rotating shaft so as to cause rotation of the shaft which is typically connected to a generator, pump, or other driven device. In most types of turbines, it is necessary that seals be provided to prevent leakage along the shaft. This is particularly true where the turbine is used in a closed cycle or where the turbine fluid is toxic, corrosive, or otherwise hazardous.

With the advent of space applications and nuclear devices and a need for different types of turbines for these and other applications, the problem of sealing to prevent leakage between the rotating shaft and the housing becomes even more acute. A type of turbine, for example, has been developed in recent years for space use which utilizes mercury vapor as the working fluid rather than steam.

Preventing leakage is a critical factor in turbines of the above type that must operate in space for long periods of a year or more. It can be seen that if there is substantial leakage of the mercury, or of the bearing lubricating oil, the turbine would stop operating. Also, long-running turbines in ground installations that must remain unattended and must operate for long periods of time, must operate without substantial leakage of the working fluid, or bearing lubricant. It can also be seen that where the working fluid for the turbine is mercury or other expensive fluids, it would be very costly to operate a turbine where there was appreciable leakage loss.

In its briefest aspect, this invention provides a pumping action between the rotating shaft and the housing, which pumping action is provided by a first simple helical groove pump feeding to a pump contained within a slinger space working in opposition to said first pump, and a second simple helical groove pump also working in opposition to said first pump and also feeding to the slinger space. Both helical groove pumps cooperate with a cooling medium so as to provide a common liquid-vapor interface. This interface is formed in the slinger space by the combination of the pumping action of the pumps in opposition as well as the cooling of the fluid between the shaft and the housing so as to provide this interface.

It is therefore an object of this invention to provide a new and improved seal for sealing between a rotating shaft and the housing.

Figure 2:
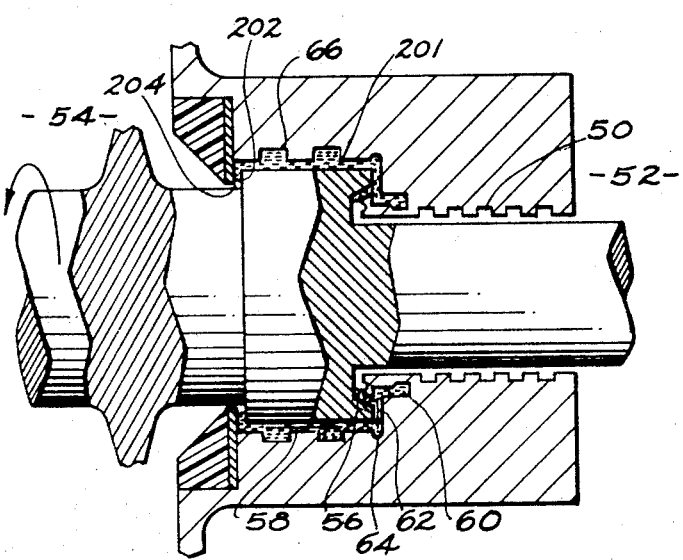

Other objects and advantages of this invention will become apparent as this description proceeds, taken in conjunction with the drawings in which:

FIG. 1 is a view partially in cross section of a portion of the housing, rotating shaft member and turbine disk employing one embodiment of this invention; and FIG. 2 is a view of another embodiment of this invention.

Referring to FIG. 1, there is shown a housing member 2 that is a portion of a turbine housing and a portion only thereof is shown for purposes of clarity. Housing 2 includes a first portion 4 and a second portion 6. Portion 6 is exposed to cavity 8 which includes mercury vapor which drives turbine blades on periphery of turbine disk 10 (partially shown) which are conventional. Turbine disk 10 is affixed to rotating shaft member 12 which rotates within housing 2. The bearing support shaft 12 within housing 2 is in the direction of arrow 14. The bearings and the fluid for lubricating the bearings are not shown. A vent 16 is provided that is vented to space or the like.

Surrounding shaft 12 is a simple helical groove 18 formed in housing 2. This groove is formed in such a way that vapor in cavity 8 is pumped in the direction of arrow 20 as shaft 12 rotates in the direction of arrow 13. In a similar manner, helical groove 22 is formed in housing 4 so as to pump vapor in the groove 22 between rotating shaft 12 and housing 4 in the direction of arrow 24.

A passage 36 is formed in housing 2 about rotating shaft 12. This passage is for the purpose of circulating a cooling medium such as oil so as to cool the fluid in the space between shaft 12 and housing 2. Alternatively, the housing 4 could be externally cooled in the region of the helical pump 18 and slinger space 26.

A space 26 is formed by shoulder 44 of shaft 12 and the wall of the housing. The space is provided between helical grooves 18 and 22 and is known as a slinger space. The slinger action of the slinger pump is provided by the surface of the turbine shaft 12 in this space which on rotation operates like a centrifugal pump to throw liquid, that has been condensed by the cooling medium, outwardly in the direction of arrow 28.

If desired, a contact seal 30 may be provided between an enlarged shoulder 32 on rotating shaft 12 and a supporting member 34 which may comprise a diaphragm or spring so as to urge seal 30 against shoulder 32. This seal would function until shaft 12 begins rotating to bring helical grooves 18 and 22 into action. Since there is a contact seal it will wear away in time, so it would have only limited use. This seal could also be actuated to disengage the seal from the shaft after rotation is established.

In operation, when shaft 12 is rotated relative to housing 2 by the operation of mercury vapor in compartment 8, a portion of this mercury vapor will be pumped by the action of groove 18 due to the rotating action of shaft 12 toward slinger space 26. The mercury vapor condenses to a liquid 101 in the groove(s) 18 due to the housing 4 being cooled in the region of the groove 18 and slinger space 26 by the cooling medium circulating in passage 36, and a vapor-liquid interface 102 is created in the space between the housing 4 and shaft 12. The action of the groove(s) 18 which tends to pump the liquid mercury 101 toward the slinger space 26 is opposed by the slinger action of the surface of shaft 12 in slinger space 26 which throws the liquid in the direction of arrow 28 to form a liquid-vapor interface 102 facing the vapor in the cavity 8 and a liquid-vapor interface 40 facing the vapor in helical groove(s) 22.

When oil or other cooling medium, which is at a low temperature, is introduced into passage 36, the mercury vapor will be cooled to a liquid, which forms the liquid of the liquid-vapor interfaces at 102 and 40. Due to the presence of this liquid-vapor interface(s), a minimum amount of leakage of turbine operating fluid will flow from compartment 8 which is at a relatively high pressure to vent 16 which is at a much lower pressure, as will be noted below.

A typical pressure in cavity 8 for a mercury vapor operating fluid turbine is 20 p.s.i.a. at a temperature of 700 degrees F. The liquid mercury pressure at the outer periphery of the slinger space is about 25 p.s.i.a., and this decreases to essentially zero p.s.i.a. at the interface 40. The actual pressure at the interface 40 is the vapor pressure of the mercury and depends on the liquid temperature. By the use of oil in coolant passages 36, which is maintained at a temperature of 225 degrees F., a liquid-vapor interface at 40 is formed which is typically at a pressure of 0.05 p.s.i.a. at a temperature of 310 degrees F. In vent 16, the pressure is $10^{-7}$ mm. of mercury. Thus the seal has functioned to decrease the 20 p.s.i.a. pressure in turbine cavity 8 to 0.05 p.s.i.a. pressure at interface 40, and the 0.05 p.s.i.a. pressure at interface 40 to $10^{-7}$ mm. of mercury at vent 16 to substantially reduce the amount of leakage. Further, since there are no parts to wear out, the seal will function over extremely long periods of time.

It is pointed out that while the surface of the shaft 12 in slinger space 26 acts as a centrifugal-type pump, shaft 12 may have blades thereon in slinger space 26 to aid in pumping. It is also noted, that while housing 4 is shown with the helical grooves, and the surface of shaft 12 is smooth, that this can be reversed and the grooves provided in shaft 12, or grooves in both housing and shaft.

With the above simple helical grooves, it will be seen that it will be relatively easy to manufacture this seal. All that is required is that threads be cut into the housing or in the shaft, or in both. This can be performed with such simple equipment as a lathe, for example. It also will be apparent to those skilled in the art that while this seal construction is described with respect to mercury as the working fluid, that it will be applicable to other fluids as well, such as, for example, preventing leakage of lubricating oil along a shaft.

FIG. 2 is similar to the embodiment shown in FIG. 1 except that the separate coolant passage for the introduction of oil into the housing has been eliminated, and cooled mercury is injected into the seal so as to provide a liquid vapor interface. Thus, a molecular pump formed by groove 50 pumps from vent 52 toward working cavity 54. Likewise, the slinger action of the shaft in slinger space tends to throw fluid radially outwardly to form an interface 56. Fluid passing in the direction of arrow 58 will be resisted by the slinger action and the pumping action of groove or molecular pump 50. Mercury liquid at a lower temperature is introduced into the seal at point 60 and will tend to pass due to the slinger action in the direction of arrow 62. An exit port 64 is provided such that the mercury coolant is removed from the seal and then recirculated through means not illustrated. Thus, the need for a separate oil coolant passage is eliminated due to the introduction of the cooled mercury and subsequent removal. A vapor-liquid interface 202 is also formed in slinger space 204. Alternatively a helical groove pump 66 may likewise be provided in a manner similar to that in FIG. 1, to contribute to the creation of a vapor-liquid interface in the helical groove pump 66.

Thus it can be seen that by the different embodiments of this invention that an effective structure for sealing a turbine shaft or other shaft has been provided. Minimum leakage, as well as simple construction, is accomplished, thus obviating many problems of the prior art.

Having described this invention, it is to be understood that it is to be limited only by the scope of the claims appended hereto.

What is claimed is:
1. In combination:
    (a) a rotatable shaft member;
    (b) a cavity containing high pressure vapor acting on one area of said shaft member;
    (c) a vent to a lower pressure area communicating with another area of said shaft member;
    (d) a housing member surrounding said shaft member to form a fluid receiving seal space extending between said cavity and vent, said housing member having a slinger space and a slinger pump formed in said space by said shaft member and said housing member adapted upon rotation of said shaft member to pump liquid from said space toward said cavity;
    (e) a first pump associated with said shaft member and housing member adapted upon rotation of said shaft member to pump vapor from said cavity toward said slinger space;
    (f) a second pump associated with said shaft member and housing member adapted to pump vapor from said vent toward said slinger space; and
    (g) means to cool said vapor to form a liquid within said first pump whereby a liquid-vapor interface is formed in said slinger space between said first and second pumps to minimize leakage of said vapor.
2. A combination, according to claim 1, wherein said first pump comprises a helical groove in one of said members between said slinger space and said cavity, and said second pump comprises a helical groove in one of said members between said slinger space and said vent.
3. A combination, according to claim 2, wherein said first pump comprises a helical groove in said housing member and said second pump comprising a helical groove in said housing member, and said first and second pump grooves extend in opposite directions away from said slinger space.

4. A combination, according to claim 1, wherein said means to cool said vapor comprises a passageway formed in said housing about said shaft member separate from said seal space for circulating a cooling medium to cool the vapor in said first pump.

5. A combination according to claim 1, wherein said vapor is mercury vapor and said means to cool said vapor comprises cooled mercury liquid at a lower temperature than the mercury liquid within said first pump, said housing member including means to introduce said cooled mercury to said vapor-liquid interface, and further including means to remove said cooled mercury from said seal space.

References Cited
UNITED STATES PATENTS

| | | | |
|---|---|---|---|
| 2,330,730 | 9/1943 | Mosshart | 277—16 |
| 3,076,656 | 2/1963 | Hofmann | 277—134 X |
| 3,131,940 | 5/1964 | Ertaud | 277—134 X |
| 3,150,822 | 9/1964 | Dreyfus et al. | 277—134 X |
| 3,161,413 | 12/1964 | Audemar | 277—134 X |
| 3,355,179 | 11/1967 | McGrew | 277—134 |
| 945,900 | 1/1910 | Ahlquist | 277—13 |

SAMUEL ROTHBERG, Primary Examiner

U.S. Cl. X.R.

277—67, 134